United States Patent
Messaddeq et al.

(10) Patent No.: US 7,773,647 B2
(45) Date of Patent: Aug. 10, 2010

(54) GLASS FOR OPTICAL AMPLIFIER FIBER

(75) Inventors: Younés Messaddeq, Araraquara (BR);
Sidney J. L. Ribeiro, Araraquara (BR);
Edison Pecoraro, Araraquara (BR);
Eduardo Mauro Nascimento, Bauru (BR)

(73) Assignee: Ericsson Telecomunicacoes S.A., Sao Paulo - SP (BR)

( * ) Notice: Subject to any disclaimer, the term of this patent is extended or adjusted under 35 U.S.C. 154(b) by 269 days.

(21) Appl. No.: 11/596,014

(22) PCT Filed: May 11, 2004

(86) PCT No.: PCT/BR2004/000065

§ 371 (c)(1),
(2), (4) Date: Sep. 9, 2008

(87) PCT Pub. No.: WO2005/108319

PCT Pub. Date: Nov. 17, 2005

(65) Prior Publication Data

US 2009/0010286 A1 Jan. 8, 2009

(51) Int. Cl.
*H01S 3/00* (2006.01)
*H01S 3/30* (2006.01)
*H01S 3/17* (2006.01)

(52) U.S. Cl. .................. 372/40; 372/6; 359/341.5; 359/343

(58) Field of Classification Search ............ 372/40, 372/6; 359/341.5, 343
See application file for complete search history.

(56) References Cited

U.S. PATENT DOCUMENTS 6,589,895 B2 * 7/2003 Dejneka et al. ............... 501/42

FOREIGN PATENT DOCUMENTS

EP   1 180 835 A   2/2002

OTHER PUBLICATIONS

Sakamoto et al., "I.4-M-Band Gain Characteristics of a TM-HO-Doped Zblyan Fiber Amplifier Pumped in the 0.8-Micrometer Band", IEEE Photonics Technology Letters, vol. 7, No. 9, Sep. 1, 1995, pp. 983-985, XP000527496.*
International Search Report of PCT/BR2004/000065, mailed Jan. 18, 2005.
Song Jay Hyok et al., "Emission properties of PbO-Bi2O3-Ga2O3-GeO2 glasses doped with Tm3+ and Ho3+", Journal of Applied Physics, American Institute of Physics, vol. 93, No. 12, Jun. 15, 2003, pp. 9441-9445, XP012058745.
H. Jeong et al, "Broadband amplified spontaneous emission from an $Er^{3+}Tm^{3+}$ codoped silica fiber", Optics Letters, vol. 28, Issue 3, Feb. 2003.
Information Gatekeepers Inc, Market Report (overview) "Optical Amplifiers: Technology and Systems", Apr. 1999, available at http://www.igigroup.com/st/pages/opticalamp.html.

* cited by examiner

*Primary Examiner*—Armando Rodriguez
(74) *Attorney, Agent, or Firm*—NIxon & Vanderhye P.C

(57) ABSTRACT

A germanate glass composition suitable for use in a fiber amplifier for broadband amplification of optical signals is provided. The glass preferably includes 35-75% $GeO_2$, 0-45% PbO, 5-20% BaO, 5-20% ZnO, and 2-10% $R_2O$ (R=Na, Li, K). It is doped with thulium ions ($Tm^{3+}$) and codoped with holmium ions ($Ho^{3+}$). The glass composition of results in a remarkably large bandwidth as compared with previous glasses. It is also highly compatible with existing silica optical fibers.

11 Claims, 2 Drawing Sheets

US 7,773,647 B2

GLASS FOR OPTICAL AMPLIFIER FIBER

TECHNICAL FIELD

The present invention relates to optical fibers and in particular to a glass composition suitable for use in a fiber amplifier for amplification of optical signals.

BACKGROUND

Telecommunication networks of today generally employ optical fibers for signal transmission. Optical signals are transported long distances on optical carriers and features like long legs and power splitting necessitate amplification of weakened signals. Optical amplifiers typically comprise a comparatively short amplifier fiber doped with a rare-earth ion or another substance that is capable of fluorescing. Light from a pump source causes electrons of the rare-earth ions to jump to a temporary excited stage, and light of the input signal stimulates spontaneous emission from the excited level. The light of this emission presents the same characteristics (wavelength, polarization and direction of propagation) as the input signal and the emission results in that the gain of the input signal is increased.

The demand for increasing bandwidth, primarily caused by the tremendous growth of the Internet, is driving the rapid deployment of optical amplifiers. For the conventional (C) band, it is well known to use erbium doped fiber amplifiers (EDFA), which has been thoroughly researched. However, the increasing demand for bandwidth in wavelength division multiplexing (WDM) optical communication systems has led towards extending the transmission bands outside the C-band. Below the C-band, there is the so-called S-band (1460-1520 nm) for which the more recent thulium doped fiber amplifiers (TDFA) are suitable. There are also new EDFAs, operating at a record 25 dBm output power, which have a gain flatness of less than 0.8 dB over the L-band (1570-1610 nm).

Both EDFA and TDFA use fibers doped with rare earth ions that typically show a bandwidth of approximately 90 nm. In [1], for example, an $Er^{3+}/Tm^{3+}$ codoped silica fiber with a bandwidth from 1460 to 1550 nm is described. The maximum values of optical amplifier bandwidth presented, all kinds of glass compositions considered, lie in the range of 110-130 nm [2, 3]. In order to achieve true broadband amplification, this bandwidth is not sufficient. It would be very desirable to find a way of improving the bandwidth of optical amplifiers based on rare earth doped fibers.

Moreover, a problem associated with previous fiber types, such as fibers based on fluoride, tellurite and chalcogenide glasses, are the inferior mechanical properties thereof. Such fibers are often incompatible with the conventional silica fibers used in telecom.

Accordingly, the optical amplifier fibers of conventional telecommunication systems are far from satisfactory and there is a considerable need for an improved glass composition allowing broadband amplification of optical signals.

SUMMARY

A general object is to provide improved optical amplifier fibers. A specific object is to improve the bandwidth of optical amplifier fibers doped with rare-earth ions. Another object is to achieve a broadband optical amplifier fiber that easily can be implemented together with conventional telecommunication systems.

These objects are achieved in accordance with the attached claims.

Briefly, a new germanate ($GeO_2$) glass composition suitable for broadband optical amplifier fibers is provided. The glass is doped with thulium ($Tm^{3+}$) and co-doped with holmium ($Ho^{3+}$). The glass includes at least 35 mole % $GeO_2$, as well as the metal oxides BaO, ZnO, and $R_2O$ (R=Na, Li, K). Preferably, up to 45 mole % PbO is also included. A preferred example embodiment uses the glass $50GeO_2$-25PbO-10BaO-10ZnO-5$K_2$O. The glass composition results in a considerably broadened bandwidth as compared to previous glasses. A bandwidth of about 310 nm is achieved, enabling for a new kind of broadband optical amplifiers and operation in the $S^{++}$, $S^+$, S, C, L and L.sup.+ bands at the same time. Another advantage is that the germanate glass has similar properties as silica glasses, which makes the fibers highly compatible with the silica optical fibers used for signal transmission in conventional communication systems.

According to other aspects, an optical amplifier fiber, an optical amplifier, and a laser device are provided.

DETAILED DESCRIPTION

Figure 1:
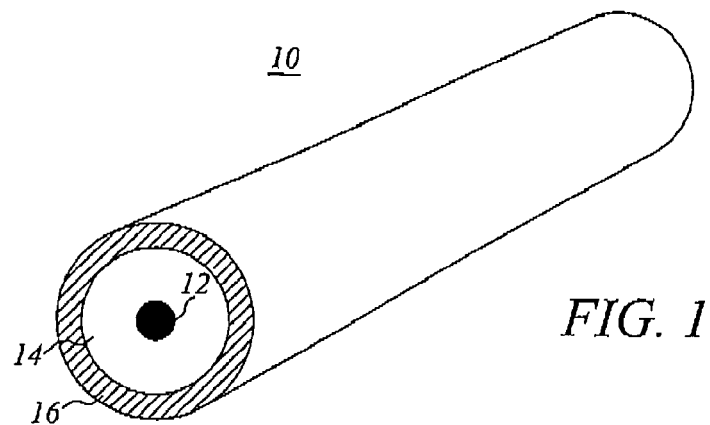
FIG. 1 is a schematic cross-sectional view of an exemplary embodiment of an optical amplifier fiber.

FIG. 1 illustrates the basic structure of a typical fiber-optic cable. An optical fiber 10 comprising a core 12 and a cladding 14 is shown. The core 12 is a transparent glass material through which the light travels. It is surrounded by another glass sheet, the cladding 14, which generally has a refractive index lower than that of the core. The cladding acts like a mirror, reflecting light back into the core, and the light is thus transmitted through the optical fiber 10 by means of internal reflection. The outer side of the optical fiber 10 is covered with a protective coating 16 of an insulating material.

If the optical fiber is used for amplifying purposes, the core glass is generally doped with a substance that is capable of fluorescing, such as a rare earth ion. Light from a pump source causes electrons of the rare-earth ions to jump to a temporary excited stage, and the light of the input signal stimulates spontaneous emission of the excited level. The light from this emission has the same characteristics (wavelength, polarization and direction of propagation) as the input signal and the emission results in that the gain of the input signal is increased.

As mentioned in the background section, a problem with glasses for optical amplifier fibers is that they are associated with too narrow bandwidth to allow efficient and wide broadband emission. A glass allowing amplification in the $S^{++}$, $S^+$, S, C, L and $L_+$ bands at the same time would be very desirable. However, the best optical amplifiers that have been presented in the prior-art have a bandwidth around 110-130 nm [2, 3]. To our knowledge, 130 nm is the maximum value presented, irrespective of glass composition.

A new glass composition is disclosed that has outstanding amplification properties and a considerably increased bandwidth as compared to previous glasses. This is achieved by a germanate glass comprising an advantageous combination of metal oxides. More specifically, the glass composition includes at least 35 mole % $GeO_2$, 0-45 mole % PbO, as well as appropriate amounts of the metal oxides BaO, ZnO, and $R_2O$ (R=Na, Li, K). The glass is doped with the rare earth ions $Tm^{3+}$ and $Ho^{3+}$.

Figure 2:
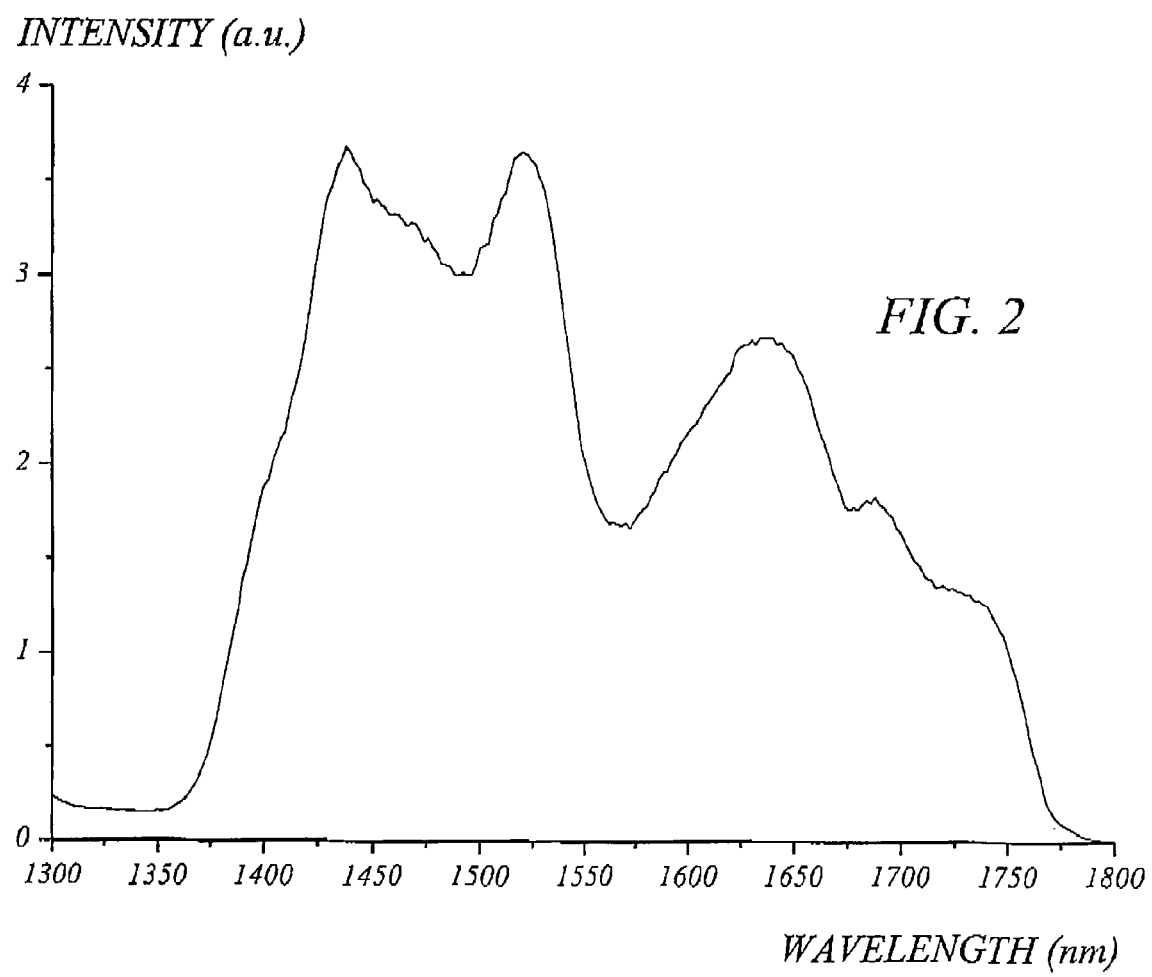
FIG. 2 contains an emission spectrum for an exemplary rare-earth doped germanate glass composition.

The new type of broadband emission achieved is illustrated by FIG. 2, which shows a spectrum for the proposed germanate glass codoped with $Tm^{3+}/Ho^{3+}$. Pumping at 488 nm, 300K, a luminescence broadband is observed from 390 nm to 700 nm, i.e. over 310 nm at half the height. This means that the germanate glass can be used for amplification in the $S^{++}$, $S^+$, S, C, L and $L^+$ bands at the same time.

Recalling that the maximum bandwidth in the prior art is around 130 nm, FIG. 2 shows that the proposed glass composition presents a bandwidth of 310 nm for the same spectral range. Thus, the technology in this application results in a more than doubled bandwidth, or an increase of about 140%. The broadband amplified spontaneous emission obtained enables a new type of broadband amplifier capable of operating in bandwidth range of up to 310 nm.

Preferred glasses thus provide an amplification wavelength band of 310 nm and in any case a bandwidth of 250 nm or more can easily be obtained using the technology in this application.

The large bandwidth of the proposed germanate glass is due to the favorable spectroscopic properties of the host composition. The host composition creates a non-homogeneous network where the dopant ions ($Tm^{3+}$ and $Ho^{3+}$) are enclosed. Each ion responds differently to the surrounding environment and this may cause broadening of the band emission. The total bandwidth is the overall summation of emissions for all dopant ions present. The proposed glass provides an excellent environment for the $Tm^{3+}$ and $Ho_{3+}$ ions and results in an improved shift amplitude, i.e., an improved bandwidth compared to previously known glasses.

A major advantage is that the proposed new glass fibers are associated with the same characteristics as silica fibers. By using fibers based on a germanate glass, the mechanical properties become much better that for fluoride, tellurite and other heavy metal oxide glasses in the sense that they resemble those of conventional silica fibers. Hence, such fibers are highly compatible with existing silica fibers.

Other advantages of the new glass are that it presents a high thermal stability against devitrification as well as a high viscosity. These parameters are crucial during the drawing process to manufacture optical fibers.

Table 1 contains approximate mole % values for a preferred germanate glass. The glass can very well also present other mole % values, such as the glasses $(75-X)GeO_2\text{-}(X)PbO\text{-}10BaO\text{-}10ZnO\text{-}5K_2O.2Tm^{3+}\text{-}0.2Ho^{3+}$, with X between 0 and 40. Table 2 contains preferred mole % ranges for the components of germanate glasses.

TABLE 1

| $GeO_2$ | PbO | BaO | ZnO | $K_2O$ | $Tm_2O_3$ | $Ho_2O_3$ |
|---|---|---|---|---|---|---|
| 50 | 25 | 10 | 10 | 5 | 0.01-2.5 | 0.01-2.5 |

TABLE 2

| GeO2 | PbO | BaO | ZnO | $R_2O$ | $Tm_2O_3$ | $Ho_2O_3$ |
|---|---|---|---|---|---|---|
| 35-75 | 0-45 | 5-20 | 5-20 | 2-10 | 0.01-2.5 | 0.01-2.5 |

As illustrated by the above tables, the proposed glass preferably contains $K_2O$, but one or more other alkalimetal oxides may also be used, more specifically $R_2O$, where R=Na, Li, and/or K.

It should be mentioned that germanate glasses have been used as hosts for Tm.sup.3+ in the prior art. An example is the glass fiber of [3] comprising GeO.sub.2 and Ga.sub.2O.sub.3 for operation in the 1460-1530 nm wavelength band.

An optical amplifier fiber may with advantage present the basic structure, which was described above with reference to FIG. 1. In other words, FIG. 1 is a schematic cross-sectional view of an exemplary embodiment of an optical fiber. The optical fiber 10 comprises the core 12, the cladding 14 and preferably also the protective coating 16. The core glass comprises the above-described germanate glass host, preferably $(35\text{-}75)GeO_2\text{-}(0\text{-}45)PbO\text{-}(5\text{-}20)BaO\text{-}(5\text{-}20)ZnO\text{-}(2\text{-}10)R_2O$, and is doped with a first lanthanide oxide (Tm.sub.2O.sub.3) and codoped with a second lanthanide oxide ($HO_2O_3$).

The glass compositions of the core and cladding should be about the same to avoid a significant expansion coefficient mismatch. The same germanate glass composition can for example be used as a base for both the core 12 and the cladding 14 of the optical fiber 10. The core glass can then be doped and modified to contain a higher amount of a substance used for refractive index control.

It should be noted that the optical fiber structure of FIG. 1 is simplified. Other optical fibers that employ the technology in this application may present more complex structures with non-symmetrical components, graded-index cores, more than one cladding, etc.

Figure 3:
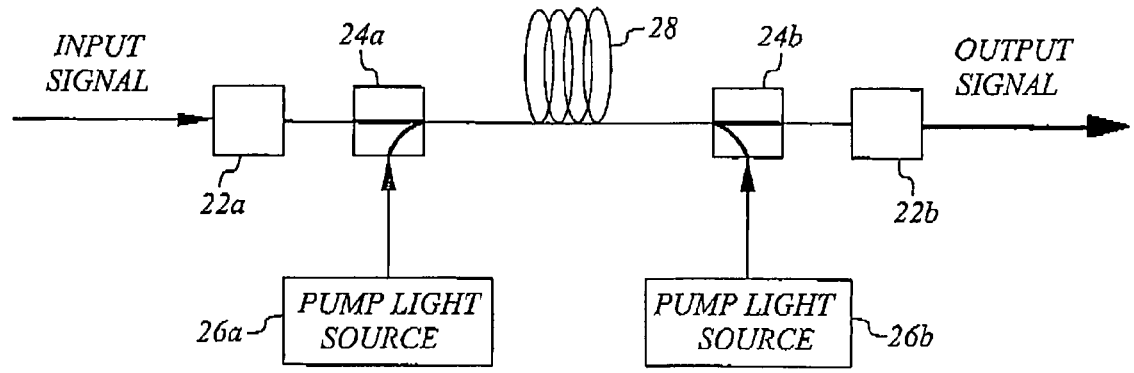
FIG. 3 is a schematic block diagram of an exemplary embodiment of an optical amplifier.

FIG. 3 is a schematic block diagram of an exemplary embodiment of an optical amplifier. The illustrated optical amplifier 20 comprises a signal processor 22, couplers 24, pump light sources 26 and an optical amplifier fiber 28. A weak optical signal that needs to be amplified is input to the amplifier 20. The input signal first passes the optional signal processor 22a, which modifies the signal in an appropriate way. The amplifier fiber 28 is pumped at both ends with pump lasers or similar pump light sources 26a and 26b ($\lambda_{exc}$=488 nm or 800 nm). The couplers 24a and 24b combine the excitation light provided by the pump light sources with the signal light. In the amplifier fiber 28, the excitation light then causes the rare-earth ions ($Tm^{3+}$, $Ho^{3+}$) to attain a temporary excited state. As the electrons decay, light with the same characteristics as the input signal is emitted and the gain of the optical signal is thus increased. Finally, the amplified signal is further modified in the optional signal processor 22b. A comparatively strong optical signal is output from the amplifier The optical amplifier fiber 28 of the optical amplifier 20 comprises a core of a germanate glass doped with rare earth ions. The core (and possible also the cladding) includes the germanate glass host of the invention, e.g. $(35\text{-}75)GeO_2\text{-}(0\text{-}45)PbO\text{-}(5\text{-}20)BaO\text{-}(5\text{-}20)ZnO\text{-}(2\text{-}10)R_2O$. The core is doped with $Tm^{3+}$ and $Ho^{3+}$ (0.01-2.5%).

The signal processor 22 preferably comprises isolators, the purposes of which are to prevent unwanted reflections and suppress the oscillations of the amplifier. The signal processor 22 may also include further devices for modulation, filtering, polarization, absorption, attenuation, etc.

The optical amplifier according to FIG. 3 may of course be subject to various modifications. It would for instance be possible to use a single pump light source (and a single coupler), even though two pump light sources generally result in better amplifier efficiency. The number and position of the optional signal processor units may vary and filters and the like can be either internal or external. There may further be more than one amplifier fiber in the optical amplifier. Besides the amplifier fiber(s), there are generally several undoped "ordinary" optical fibers in the optical amplifier, providing connections between components thereof.

Additionally, the optical amplifier may also be employed as a complementary amplifier for side-band amplification in EDFA networks. In this case, the gain of the spectral range corresponding to the side band will be 50% improved. This represents a new and very advantageous application for the optical amplifier glass fiber.

Figure 4:
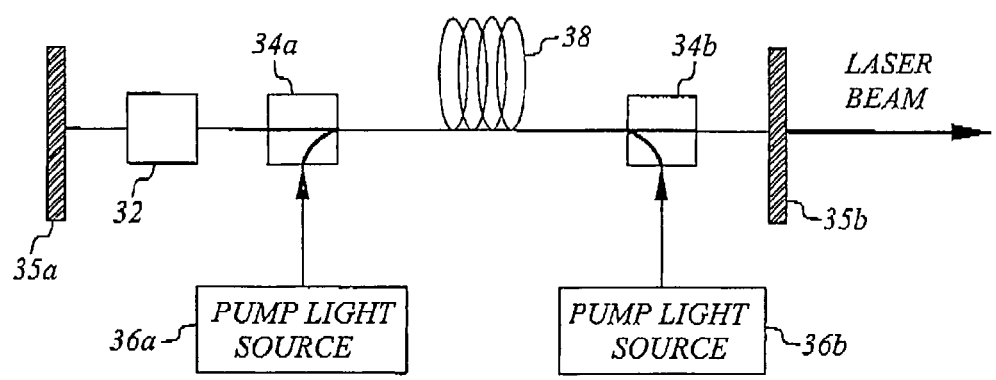
FIG. 4 is a schematic block diagram of an exemplary embodiment of a laser device.

The above-described optical amplifier glass may also be used in other optical devices, such as solid state lasers (where the active medium is a glass rod), active waveguides, infrared sensors, etc. FIG. 4 is a schematic block diagram of an exemplary embodiment of a fiber laser device. Each laser device component is provided with the same reference number as the corresponding amplifier component (FIG. 3) plus 10. The main difference between the laser device and the optical amplifier is that the laser device does not receive a signal light input but has feedback for signal generation. The laser device 30 of FIG. 4 accordingly comprises two reflectors 35, placed at opposite ends of the optical amplifier fiber 38. Excitation light from the pump light sources 36 give rise to photon emission in the amplifier fiber 38 in the same way as for the optical amplifier. The first reflector 35a is preferably a high reflector mirror, ideally reflecting all light, whereas the second reflector 35b is a partially transparent mirror. The relatively small fraction of light passing through the second reflector is the laser beam output of the laser device 30. Optional signal processor 32 of the laser device may include internal or external devices for modulation, filtering, polarization, q-switching, absorption and the like.

In another embodiment (not shown) of the laser device, feedback is instead achieved by a ring-shaped fiber structure, where a part of the output signal basically is led back to the coupler 34a.

Although the technology in this application has been described with reference to specific illustrated embodiments, it should be emphasized that it also covers equivalents to the disclosed features, as well as modifications and variants obvious to a man skilled in the art. Thus, the scope of the invention is only limited by the enclosed claims.

REFERENCES

[1] H. Jeong et. al, "Broadband amplified spontaneous emission from an $Er^{3+}Tm^{3+}$ codoped silica fiber", Optics Letters, Vol. 28, Issue 3, February 2003.
[2] Information Gatekeepers Inc, Market Report (overview) "Optical Amplifiers: Technology and Systems", April 1999, available at http://www.igigroup.com/st/pages/opticalamp.html
[3] U.S. Pat. No. 6,589,895, Corning Inc.

The invention claimed is:

1. A germanate glass composition for optical fiber amplification being doped with $Tm^{3+}$ and $Ho^{3+}$ and further comprising at least 35 mole % $GeO_2$ and oxides of Ba, Zn and R, R being selected from the group of Na, Li, and K, said glass composition comprising:
   about 50 mole % $GeO_2$;
   about 25 mole % PbO;
   about 10 mole % BaO;
   about 10 mole % ZnO; and
   about 5 mole % $R_2O$
for broadening the amplification wavelength band associated with the glass composition.

2. The glass composition according to claim 1, wherein the glass component amounts are such that the amplification wavelength band is at least 250 nm.

3. The glass composition according to claim 1, wherein R is K.

4. The glass composition according to claim 1, comprising 0.01-2.5 mole % $Tm^{3+}$ and 0.01-2.5 mole % $Ho^{3+}$.

5. An optical amplifier fiber comprising a core surrounded by at least one cladding (14), wherein the core is at least partly formed of a germanate glass composition doped with $Tm^{3+}$ and $Ho^{3+}$ and further comprising at least 35 mole % $GeO_2$ and oxides of Ba, Zn and R, R being selected from the group of Na, Li, and K, said glass composition comprising:
   about 50 mole % $GeO_2$;
   about 25 mole % PbO;
   about 10 mole % BaO;
   about 10 mole % ZnO; and
   about 5 mole % $R_2O$
for broadening the amplification wavelength band of the optical amplifier fiber.

6. The amplifier fiber according to claim 5, wherein the glass component amounts are such that the amplification wavelength band is at least 250 nm.

7. The amplifier fiber according to claim 5, wherein R is K.

8. The amplifier fiber according to claim 5, wherein the glass composition comprises 0.01-2.5 mole % $Tm^{3+}$ and 0.01-2.5 mole % $Ho^{3+}$.

9. An optical amplifier including an optical amplifier fiber comprising a core surrounded by at least one cladding, wherein the core is at least partly formed of a germanate glass composition doped with $Tm^{3+}$ and $Ho^{3+}$ and further comprising at least 35 mole % $GeO_2$ and oxides of Ba, Zn and R, R being selected from the group of Na, Li, and K, said glass composition comprising:
   about 50 mole % $GeO_2$;
   about 25 mole % PbO;
   about 10 mole % BaO;
   about 10 mole % ZnO; and
   about 5 mole % $R_2O$
for broadening the amplification wavelength band of the optical amplifier fiber.

10. The optical amplifier according to claim 9, forming a complementary amplifier for side-band amplification.

11. A laser device (30) including an optical amplifier fiber, wherein the optical amplifier fiber is at least partly formed of a germanate glass composition doped with $Tm^{3+}$ and $Ho^{3+}$ and further comprising at least 35 mole % $GeO_2$ and oxides of Ba, Zn and R, R being selected from the group of Na, Li, and K, said glass composition comprising:
   about 50 mole % $GeO_2$;
   about 25 mole % PbO;
   about 10 mole % BaO;
   about 10 mole % ZnO; and
   about 5 mole % $R_2O$
for broadening the amplification wavelength band of the optical amplifier fiber.

* * * * *